July 22, 1952     G. A. WAHLMARK     2,604,048
PUMP
Filed Sept. 11, 1946     2 SHEETS—SHEET 1
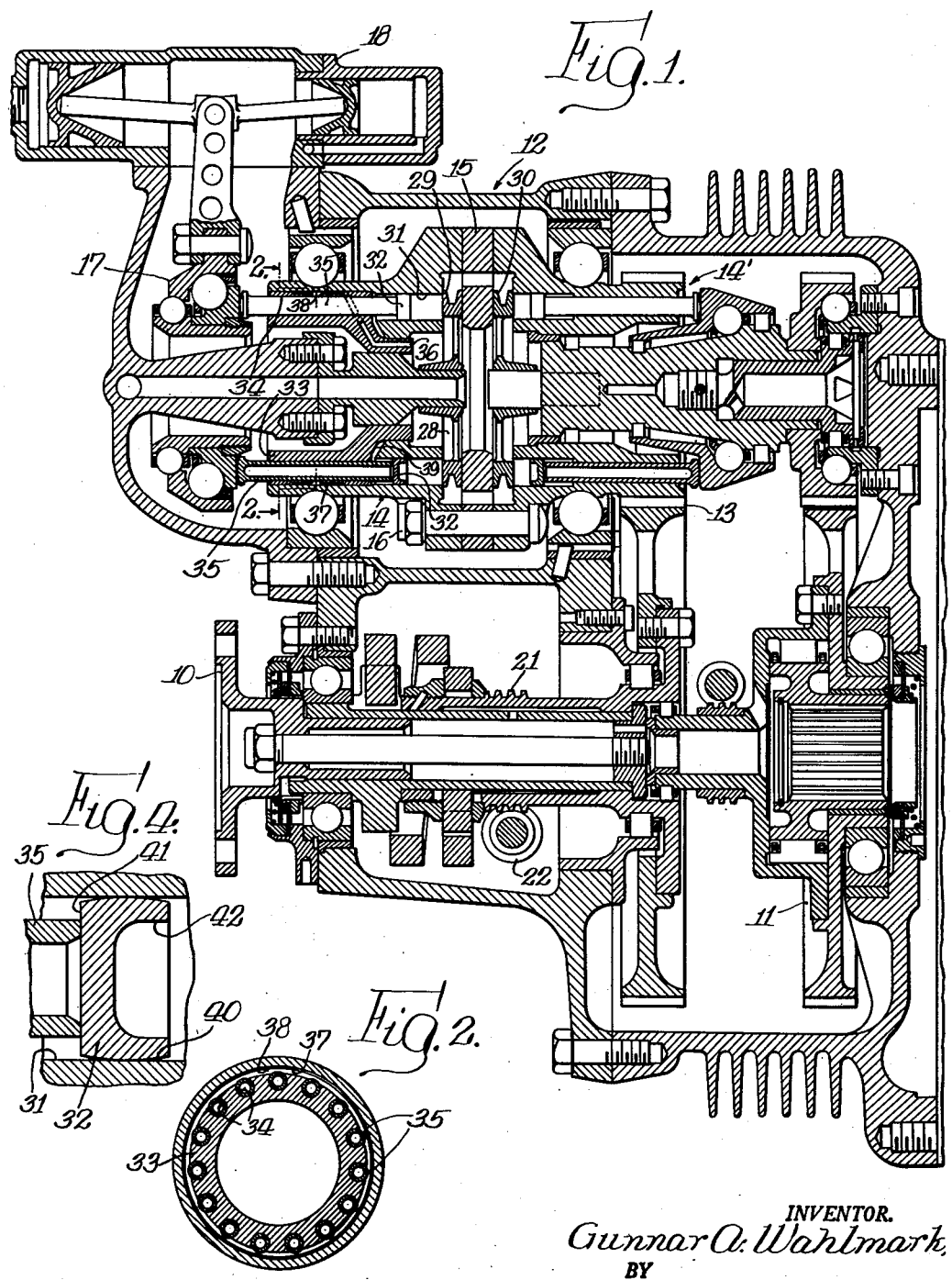
INVENTOR.
Gunnar A. Wahlmark,
BY
Chritton, Schroeder, Merriam & Hofgren
his Attys.

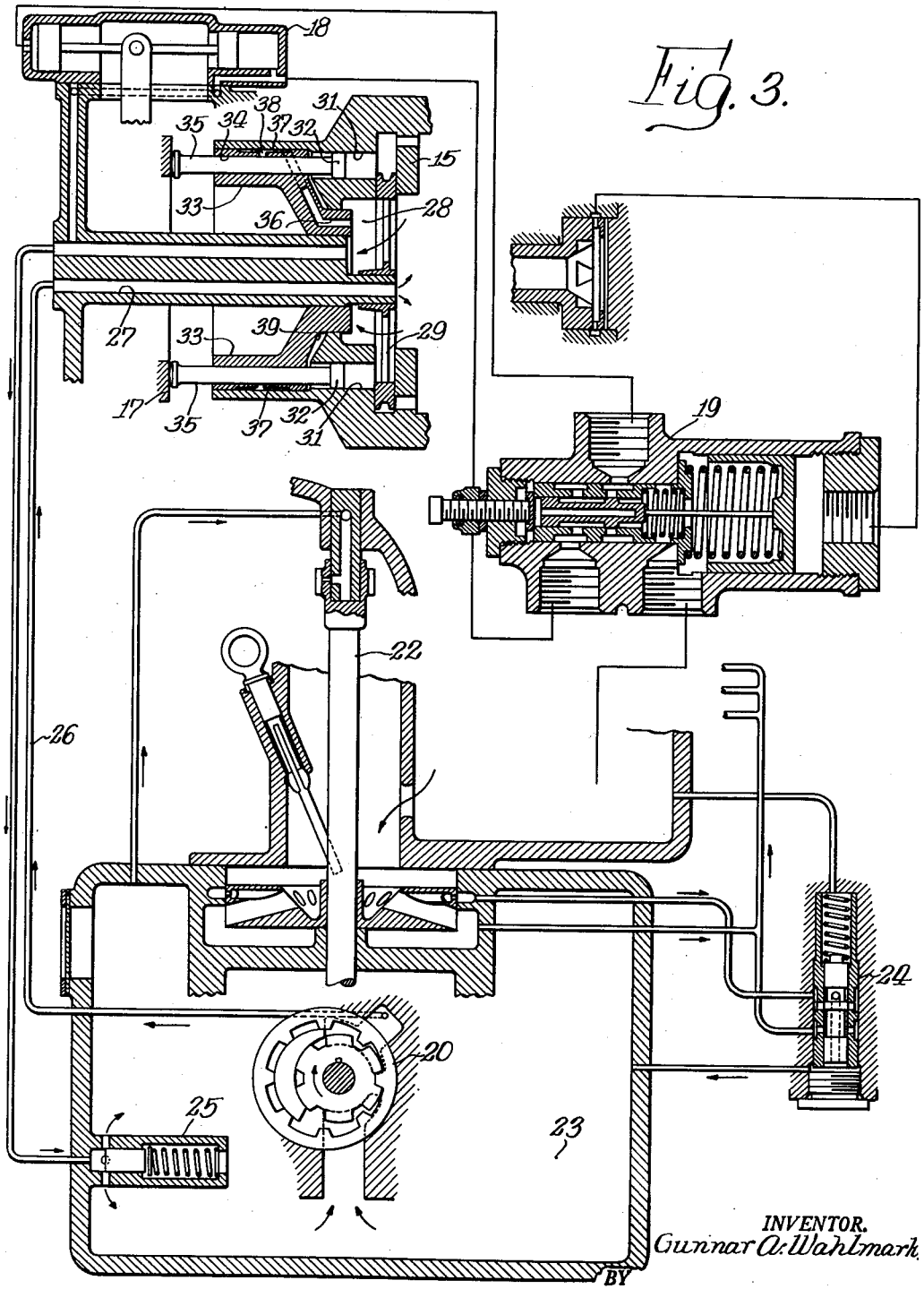

Patented July 22, 1952

2,604,048

UNITED STATES PATENT OFFICE 2,604,048

PUMP

Gunnar A. Wahlmark, Rockford, Ill., assignor to Sundstrand Machine Tool Co., Rockford, Ill., a corporation of Illinois Application September 11, 1946, Serial No. 696,190

8 Claims. (Cl. 103—5)

The invention relates generally to hydraulic transmissions and more particularly to a hydraulic transmission having a rotatable cylinder block.

It is the general object of the invention to provide a new and improved transmission of this type.

Another object is to provide such a transmission embodying a novel piston design which increases the efficiency of the transmission.

Another object is to provide a piston having side walls designed to provide an equal pressure gradient distribution throughout the diameter of the piston.

A further object is to provide a novel cylinder insert and to provide lubricating means therein which adapts the transmission for high speed operation.

Other objects will become readily apparent from the following detailed description taken in connection with the accompanying drawings. The invention is shown as embodied in a hydraulic transmission of the type disclosed and claimed in my co-pending application filed January 29, 1944, as Serial No. 520,195, now Patent No. 2,474,706.

Fig. 1 is a horizontal section through the approximate center of a hydraulic transmission of the type disclosed in my said co-pending application.

Fig. 2 is a vertical section along lines 2—2 of Fig. 1.

Fig. 3 is a diagram of a portion of the hydraulic circuit; and

Fig. 4 is an enlarged view of the piston structure.

The invention is shown as embodied in a hydraulic transmission having a rotatable pump and motor block wherein the driven element rotates at a constant speed regardless of the speed of the driving element. In general, the unit comprises a driving element 10, a driven element 11, and a hydraulic transmission 12, of the rotatable cylinder block type, driven by the driving element through gears 13. The hydraulic transmission comprises a pump 14 and a motor 14' secured together in spaced axial alignment by a spacer plate 15 and bolts 16. The quantity of fluid pumped by the pump 14 is determined by the position of a wobbler 17 whose position, in turn, is controlled by a control element 18 which is governed by a servo valve 19, all as more fully shown and described in my said co-pending application. A gear pump 20 is driven by the driving element through a worm 21 and a shaft 22 and operates in a sump 23. The sump is maintained under super-atmospheric pressure by a valve 24 in order to insure efficient operation of the pump at all times. Fluid in the hydraulic circuit is maintained at a predetermined pressure, the amount of pressure being usually in the neighborhood of 200 pounds per square inch, by a relief valve 25. Fluid from the gear pump 20 passes through a conduit 26, groove 27, to a valve chamber 28. Operable in the valve chamber 28 are identical valves 29, 30, of the wheel type disclosed in my U. S. Letters Patent No. 2,190,812, dated February 20, 1940. In the pump block 14 are formed a plurality of piston bores 31 in which my novel pistons 32 reciprocate.

It has been found that large centrifugal forces are created by high speed rotation of the transmission and, when the pump pistons are operating at small displacement during such high speed operation, the pistons exhibit a tendency to stick, the forces thus created tending to hold the pistons against the cylinder walls and tending to break down the oil film between the piston and the cylinder wall. I have over come this difficulty by the use of the novel piston 32, freely reciprocable in the piston bores 31, and the use of a bronze insert 33 in the pump block. The insert is provided with a plurality of cylinders 34 in which piston push rods 35 reciprocate, the cylinders being in axial alignment with the piston bores 31. The insert is also provided with oil passages 36 communicating with the valve chamber 28 and leading, by means of a passage 37, to an annular oil groove 38, which opens to the periphery of the piston push rods. Fluid under pressure from the valve chamber is thereby admitted to the periphery of the piston push rods, serving not only to lubricate the push rods but also, by being admitted to the periphery thereof, overcomes at least in part the centrifugal force exerted on the rods by the rapid rotation of the pump block. Excess oil from the piston push rod cylinders 34 may escape from either open end of the cylinders and is returned to the sump. Oil escaping from the right hand end (as viewed in Fig. 1) of the piston push rod cylinders escapes through a space 39 provided between the insert and the balance of the pump block and eventually finds its way back to the sump.

The space 39 also eliminates the possibilities of oil accumulating behind the piston 30 and creating resistance to the reciprocation thereof. The pistons are moved in one direction (that is to the right as viewed in Fig. 1) by the action of the wobbler on the piston push rods 35, and the pistons and the piston push rods are reciprocated to the left by the fluid under pressure from the valve chamber 28.

The novel piston 32 is freely reciprocable in the piston bores that is, the piston is unattached to the piston push rods, and is designed to eliminate the hereinbefore mentioned difficulties arising from centrifugal force. The sides 40 of the piston are crowned with a large radius having a portion slidably contacting the walls of the bores and end portions of lesser diameter. The crowned sides insure a constant film of oil between the piston and the walls of the bore. The piston is provided with a flat back face 41 perpendicular to the face of the piston push rods and a front face formed with a hollow recess 42 to reduce the weight of the piston. The light weight of the pistons reduces the centrifugal forces to which they are subjected, and the crowned sides permit hydraulic pressure to act equally and provide an equal pressure gradient distribution throughout the entire diameter of the piston and insure a constant film of oil between the sides of the piston and the walls of the bores. Space 39 drains excess oil from the left hand side of the piston and thereby permits the piston push rods 35 to operate unaffected by the hydraulic pressures generated in the circuit.

The bronze insert 33 has, of course, the same number of cylinders as there are piston bores and is axially aligned therewith and secured in fluid-tight relationship to the balance of the pump block.

While the invention has been disclosed and described herein in a particular embodiment, it is not intended that the invention is to be limited thereby to the specific disclosure made. On the contrary, it is intended to cover all modifications and alternative constructions falling within the spirit and scope of the invention as defined in the appended claims.

I claim:

1. A hydraulic pump or motor comprising a rotatable cylinder block and a plurality of annularly arranged cylinders formed therein with the axes of the cylinders being parallel to the axis of rotation of the block, a piston reciprocable in each of said cylinders and subjected to a sidewise thrust during rotation of the block, said pistons having sidewalls convex in shape, said sidewalls having a portion of such diameter as to slidably contact the sidewalls of the cylinder and a portion of lesser diameter with the curvature of the sidewalls of the piston between said portions having a radius greater than one-half the diameter of the cylinder.

2. A hydraulic pump or motor comprising, a rotatable cylinder block, a plurality of cylinders in the block having their axes parallel to the axis of rotation of the block, reciprocating means in each cylinder, means at one end of the cylinder for moving the reciprocating means on their discharge stroke, a valve chamber in the block, valve means in the chamber and operating to open the other end of the cylinders to the chamber at the end of the discharge stroke of the reciprocating means, and a pump for supplying hydraulic fluid to the chamber under pressure to move the reciprocating means on their intake stroke, said reciprocating means comprising pistons freely reciprocable in the cylinders and having convexly curved sidewalls extending from one end of each piston to the other with the radius of curvature of the sidewalls being greater than one-half the diameter of the cylinder.

3. A hydraulic pump or motor comprising, a rotatable cylinder block, a plurality of cylinders in the block having their axes parallel to the axis of rotation of the block, a wobbler at one end of the cylinders, a valve chamber at the other end of the cylinders, the wobbler end of the cylinders having a lesser diameter than the valve chamber end, a piston push rod reciprocal in the wobbler end of each cylinder, a piston reciprocable in the valve chamber end of each cylinder and unattached to the piston push rod, said push rods being in contact with the pistons and the wobbler to move the pistons on their discharge stroke, valve means in the valve chamber and operating to open the valve chamber end of the cylinders to the chamber at the end of the discharge stroke of the pistons, and a pump for supplying fluid to the chamber under pressure to move the pistons and their push rods on the intake stroke of the pistons, each of said pistons being provided with convexly curved sidewalls extending from end to end of each piston with the radius of said curve being greater than one-half the diameter of the cylinder.

4. A hydraulic pump or motor comprising, a rotatable cylinder block, a plurality of cylinders in the block having their axes parallel to the axis of rotation of the bock, a wobbler at one end of the cylinders, a valve chamber at the other end of the cylinders, a piston push rod reciprocal in the wobbler end of each cylinder, a piston reciprocable in the valve chamber end of each cylinder and unattached to the piston push rod, said push rods being in contact with the pistons and the wobbler to move the pistons on their discharge stroke, valve means in the valve chamber and operating to open the valve chamber end of the cylinders to the chamber at the end of the discharge stroke of the pistons, a pump for supplying fluid to the chamber under pressure to move the pistons and their push rods on the intake stroke of the pistons, each of said pistons being provided with convexly curved sidewalls extending from one end of each piston to the other with the radius of curvature of the sidewalls being greater than one-half the diameter of the cylinder, a fluid chamber in the block and opening to the wobbler end of each cylinder through the outer sidewalls thereof with the outer side of each push rod substantially closing said opening, and a passage connecting each chamber with the valve chamber to supply fluid to the push rods under pressure acting in opposition to the centrifugal force on the push rods during rotation of the block.

5. A hydraulic pump or motor comprising a cylinder, a piston reciprocable in said cylinder and subjected to a sidewise thrust during reciprocation, said piston having crowned side walls having a portion of such diameter as to slidably contact the cylinder walls, said portion having a radius of curvature in the plane of the axis of the cylinder greater than one-half the diameter of the cylinder whereby to prevent rocking of the piston in a plane perpendicular to the axis of the cylinder, and said side walls having an end portion of lesser diameter than the first-mentioned portion.

6. A hydraulic pump or motor comprising a cylinder, a piston reciprocable in said cylinder and subjected to a sidewise thrust during reciprocation, said piston having side walls convexly curved in the plane of the axis of the cylinder, said curve having a radius greater than one-half the diameter of the cylinder.

7. A hydraulic pump or motor comprising a cylinder, a piston reciprocable in said cylinder and subjected to a sidewise thrust during reciprocation, said piston having side walls curved in two directions, one of said directions lying in the plane of the axis of the cylinder and the other direction lying in a plane at right angles to the first-mentioned plane with the curve in said first-mentioned direction having a radius greater than the radius of curvature in the other direction.

8. A hydraulic pump or motor comprising a cylinder, a piston reciprocable in said cylinder and subjected to a sidewise thrust during reciprocation, said piston having crowned side walls having a portion of such diameter as to slidably contact the cylinder walls, and an end portion of lesser diameter than the first-mentioned portion and said side walls having a convexly curved portion intermediate the contacting portion and the end portion, said curved portion having a radius of curvature greater than one-half the diameter of the cylinder.

GUNNAR A. WAHLMARK.

REFERENCES CITED

The following references are of record in the file of this patent:

UNITED STATES PATENTS

| Number | Name | Date |
|---|---|---|
| 1,274,391 | Davis | Aug. 6, 1918 |
| 1,840,866 | Rayburn et al. | Jan. 12, 1932 |
| 1,867,308 | Durner | July 12, 1932 |
| 1,879,563 | Smith | Sept. 27, 1932 |
| 2,199,081 | Perin | Apr. 30, 1940 |
| 2,241,651 | Thoma | May 13, 1941 |
| 2,272,771 | Hawley | Feb. 10, 1942 |
| 2,299,233 | Hoffer | Oct. 20, 1942 |
| 2,313,407 | Vickers et al. | Mar. 9, 1943 |
| 2,360,025 | Wahlmark | Oct. 10, 1944 |
| 2,436,797 | Deschamps et al. | Mar. 2, 1948 |
| 2,448,347 | Beeh | Aug. 31, 1948 |

FOREIGN PATENTS

| Number | Country | Date |
|---|---|---|
| 424,609 | Great Britain | 1935 |